Nov. 30, 1943.   J. W. SHEPERDSON ET AL   2,335,800
ROLLING MILL
Filed July 18, 1941   2 Sheets-Sheet 1

INVENTORS
JOHN W. SHEPERDSON
BERNARD L. BURNS
BY
ATTORNEY

Nov. 30, 1943.  J. W. SHEPERDSON ET AL  2,335,800
ROLLING MILL
Filed July 18, 1941  2 Sheets-Sheet 2

INVENTORS
JOHN W. SHEPERDSON
BERNARD L. BURNS
BY *Albert G. Blodgett*
ATTORNEY

Patented Nov. 30, 1943

2,335,800

UNITED STATES PATENT OFFICE 2,335,800

ROLLING MILL

John W. Sheperdson and Bernard L. Burns, Worcester, Mass., assignors to Morgan Construction Company, Worcester, Mass., a corporation of Massachusetts Application July 18, 1941, Serial No. 402,920

8 Claims. (Cl. 80—56)

This invention relates to rolling mills, and more particularly to means for retaining and adjusting the roll neck bearings in a mill housing.

In a rolling mill it is necessary to support the rolls against axial movement, and in mills having a formed pass it is also necessary to provide for axial adjustment of at least one roll in order that the roll grooves may be properly aligned. The rolls must also be adjustable to and from one another to control the size of the rolled product. Various mechanisms have been proposed heretofore for adjustably supporting the roll neck bearings in the mill housing, but these prior mechanisms have been subject to certain difficulties. In some cases the bearings have been cramped so that they failed to support the load in a proper manner. In other cases, thrust loads have been applied eccentrically, causing overloading of thrust bearing surfaces, and in still other cases radial loads have been applied to bearings which were designed to receive thrust loads only, thus causing wear and destruction of the parts.

It is accordingly one object of the invention to overcome these difficulties and to provide an improved mechanism whereby roll neck bearings may be retained and adjusted without improper loading of the bearing surfaces.

It is a further object of the invention to provide an improved mechanism whereby a roll neck thrust bearing may be adjustably held against axial movement without imposing an eccentric load thereon, irrespective of transverse adjustment of the roll.

It is a further object of the invention to combine with a roll having both a radial bearing and a thrust bearing an improved mechanism which will adjustably support the thrust bearing against axial movement and at the same time prevent any of the radial load from being applied to the thrust bearing.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a fragmentary horizontal view of a rolling mill, with certain parts shown in full and other parts shown in section on the line 1—1 of Fig. 2;

Figure 1:
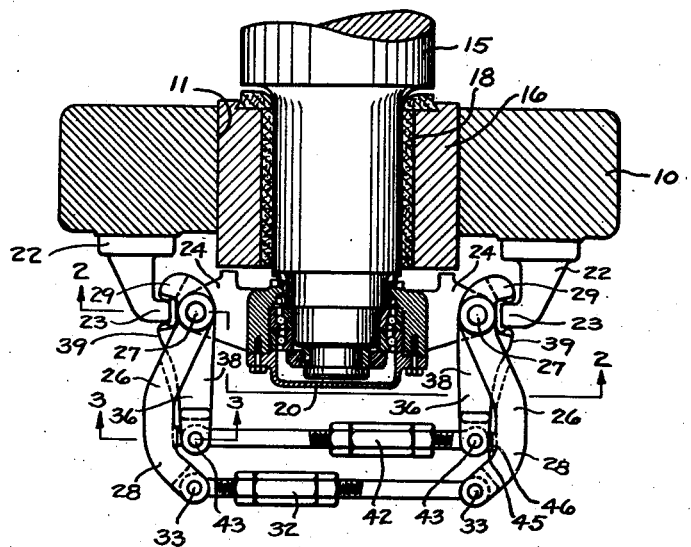
Figure 2:
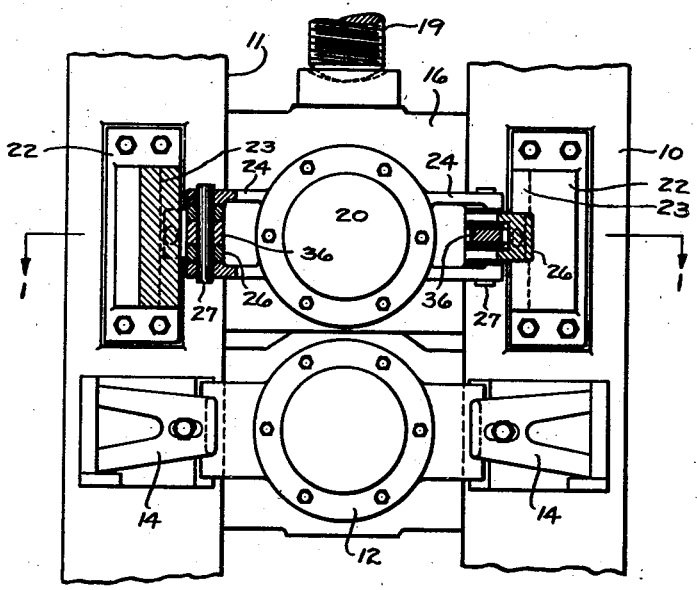
Fig. 2 is a sectional view taken on the line 2—2 of Fig. 1.
Figure 3:
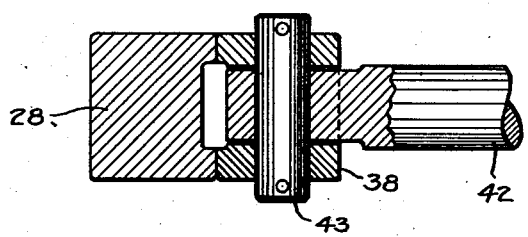
Fig. 3 is an enlarged section on the line 3—3 of Fig. 1.
Figure 6:
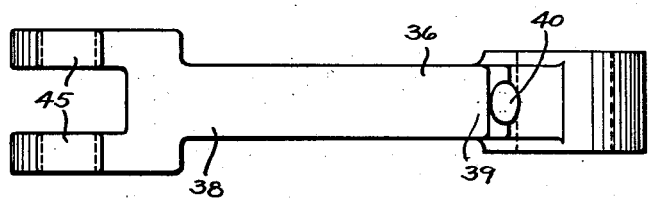
Fig. 6 is an enlarged side elevation of the arm shown in Fig. 4.

The embodiment illustrated comprises a roll housing 10 of well-known construction, one side only being shown. This housing is shaped to provide the usual window 11 for the reception of bearings for an upper and a lower horizontal roll. As shown in Fig. 2, the bearing 12 for the lower roll is secured to the housing by means of clamps 14 of conventional construction. The upper roll 15 is mounted in a bearing 16 having a lining 18 of synthetic material arranged to receive the roll neck and support the same against radial loads without preventing axial movements thereof. This upper bearing 16 is slidable vertically in the window 11, the usual adjustable vertical screw 19 being provided to limit the upward movement of the bearing. On the outer end of the roll neck there is mounted an anti-friction thrust bearing 20 of well-known construction, which is separated from the radial bearing 16 in the axial direction.

The thrust bearing 20 controls the axial position of the roll, and by adjusting this bearing the roll grooves or passes can be brought into proper alignment with the grooves in the lower roll. It is very important, however, to avoid any eccentric loading of this bearing, with the resultant application of cramping forces which would cause binding and excessive wear.

Figure 7:
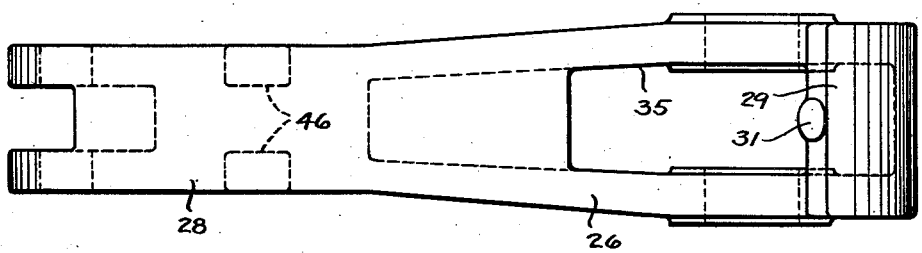
Fig. 7 is an enlarged side elevation of the arm shown in Fig. 5.
Figure 4:
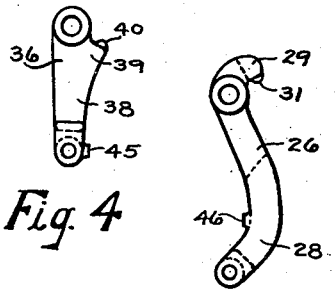
Fig. 4 is a plan view of one of the adjusting arms.
Figure 5:
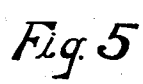
Fig. 5 is a plan view of another of the adjusting arms.

In order to retain and adjust the thrust bearing 20, two brackets 22 are secured to the housing 10 on opposite sides of the bearing. Each bracket is formed with a lug 23 which extends laterally toward the bearing, each lug having plane parallel inner and outer surfaces. The bearing 20 is provided with two pairs of vertically spaced ears 24 which extend laterally from opposite sides of the bearing toward the respective lugs 23. Between the ears 24 of each pair there is mounted a bell crank lever 26, which is fulcrumed on a pin 27 extending vertically through the ears. Each lever 26 comprises a long arm 28 which extends outwardly and a short arm or jaw 29 which extends laterally in a direction away from the bearing 20. Each of the short arms 29 is provided with a spherically-surfaced boss 31 adapted to engage the inner surface of the adjacent lug 23 and prevent outward movement of the bearing. The outer ends of the long arms 28 are forked to receive the ends of a tension link in the form of an adjustable turnbuckle 32, these parts being pivotally connected by means of vertical pins 33. As shown particularly in Fig. 7, each lever 26 is formed with a transverse opening 35 therethrough for the reception of a companion bell crank lever 36, which is likewise fulcrumed upon the corresponding pin 27. Each lever 36 comprises a long arm 38 which extends outwardly and a short arm or jaw 39 which extends laterally in a direction away from the bearing 20. Each of the short arms 39 is provided with a spherically-surfaced boss 40 adapted to engage the outer surface of the adjacent lug 23 and prevent inward movement of the bearing. It will be noted that the arms 38 are somewhat shorter than the corresponding arms 28 of the levers 26. The outer ends of the arms 38 are forked to receive the ends of a compression link in the form of an adjustable turnbuckle 42, these parts being pivotally connected by means of vertical pins 43.

It will now be apparent that outward thrust applied by the roll 15 to the bearing 20 will cause the bosses 31 to press against the inner surfaces of the lugs 23, tending to swing the arms 28 apart. Such movement will be resisted by tension forces in the turnbuckle 32. Similarly, if inward thrust is applied by the roll to the bearing, the bosses 40 will press against the outer surfaces of the lugs 23, tending to swing the arms 38 toward each other. Such movement will be resisted by compression forces in the turnbuckle 42. Thus the bearing is firmly supported in both axial directions. Since the bosses 31 and 40 are located in a common horizontal plane with the axis of the bearing, there is no possibility of applying an eccentric thrust load to the bearing. Furthermore, axial adjustment of the bearing is a simple matter. By lengthening both turnbuckles the bearing can be moved outwardly, and by shortening both turnbuckles the bearing can be moved inwardly.

The thrust bearing 20 is not adapted to withstand heavy radial loads, and it is therefore important to prevent the application of such loads thereto. For this purpose each pair of companion levers 26 and 36 is provided with cooperating parts arranged to limit their relative movements in such a direction as to prevent them from gripping the lugs 23 between the bosses 31 and 40. In the preferred construction illustrated the forked end of each arm 38 is formed with projections or shoulders 45 adapted to engage projections or shoulders 46 on the adjacent side of the corresponding arm 28. These parts are so arranged that when the projections 45 and 46 are in contact, the distance between each pair of bosses 31 and 40 will very slightly exceed the thickness of the lugs 23. Thus the bearing 20 can move freely in all directions perpendicular to its axis, and no radial load will be applied thereto. This is true regardless of adjustments of the radial bearing 16, or of wear which may take place in the lining 18 thereof.

Axial adjustments of the thrust bearing and roll are made very simply. To move these parts outwardly, the turnbuckle 32 will first be lengthened the required amount, and the turnbuckle 42 will then be lengthened until the projections 45 engage the projections 46. Similarly, to move the bearing and roll inwardly, the turnbuckle 42 will first be shortened the necessary amount, whereupon the turnbuckle 32 will be shortened until the projections 46 engage the projections 45. It is not possible for a careless operator to cramp the thrust bearing by improper adjustment of the turnbuckles. Furthermore, if the roll and the thrust bearing are adjusted up or down, the levers 26 and 36 will be moved along likewise, and the points of application of the forces to the thrust bearing will remain relatively the same, i. e. in the horizontal axial plane. Hence, the thrust bearing will be properly supported against the thrust loads at all times.

Having thus described our invention, what we claim as new and desire to secure by Letters Patent is:

1. A rolling mill comprising a roll housing, a bearing, a pair of retaining members for the bearing positioned to resist outward axial movement thereof, said members being pivotally mounted on the bearing and arranged to be turned in opposite directions by such movement, a second pair of retaining members for the bearing positioned to resist inward axial movement thereof, the members of the second pair being pivotally mounted on the bearing and arranged to be turned in opposite directions by such movement, and a link, adjustable in length, connecting the two members of each such pair.

2. A rolling mill comprising a roll housing, a bearing, and retaining means for said bearing including oppositely acting pairs of members mounted on the bearing and in position to resist, respectively, inward and outward endwise movements of the bearing, and an adjusting device for each pair, common to both members thereof.

3. A rolling mill comprising a roll housing, a bearing, means on the housing at opposite sides of the bearing providing inwardly and outwardly facing surfaces, a pair of retaining members for the bearing pivotally mounted thereon on opposite sides of the bearing axis and arranged to engage the said inwardly facing surfaces, a second pair of retaining members for the bearing pivotally mounted thereon on opposite sides of the bearing axis and arranged to engage the said outwardly facing surfaces, and an adjusting device for each pair, common to both members thereof.

4. A rolling mill comprising a roll housing, a bearing, means on the housing at opposite sides of the bearing providing inwardly and outwardly facing surfaces, a pair of bell crank levers pivotally mounted on the bearing at opposite sides of the bearing axis and having parts engaging the said inwardly facing surfaces in a common axial plane to resist outward endwise movement of the bearing, a second pair of bell crank levers pivotally mounted on the bearing adjacent the first mentioned levers and having parts engaging the said outwardly facing surfaces in the said axial plane to resist inward endwise movement of the bearing, and a separate link, adjustable in length, connecting the levers of each pair.

5. A rolling mill comprising a roll housing, a bearing, means on the housing providing lugs on opposite sides of the bearing having inwardly and outwardly facing surfaces, a set of opposed movable jaws mounted on each side of the bearing, the lugs extending between the jaws to prevent endwise movements of the bearing, means to limit the relative movement of the jaws in each set and thus prevent them from gripping the lugs tightly, and adjustable-length means connecting the corresponding jaws of each set.

6. A rolling mill comprising a roll housing, a bearing, means on the housing providing lugs on opposite sides of the bearing having inwardly and outwardly facing surfaces, a pair of bell crank levers pivotally mounted on the bearing adjacent the respective lugs and having short arms which extend laterally away from the bearing to engage the inner surfaces of the lugs, a second pair of bell crank levers pivotally mounted on the bearing adjacent the respective lugs and having short arms which extend laterally away from the bearing to engage the outer surfaces of the lugs, each of said levers having a long arm, a separate link, adjustable in length, connecting the long arms of each pair of levers, and means on the long arms providing cooperating surfaces arranged to limit the relative movement of the corresponding levers in each pair and prevent the short arms from gripping the lugs tightly.

7. A rolling mill comprising a roll housing, a bearing, means on the housing at opposite sides of the bearing providing inwardly and outwardly facing surfaces, and retaining means for the bearing mounted on the bearing on opposite sides thereof and engaging the said surfaces in such a way that endwise movement of the bearing in either direction will move the retaining means relative to the bearing, and means connecting the two retaining means and so arranged that movement of one retaining means in either direction will produce an equal movement of the other retaining means in the opposite direction and vice versa, whereby endwise movement of the bearing is prevented in both directions without imparting cramping forces thereto.

8. A rolling mill comprising a roll housing having a window, a radial bearing slidably mounted in the window, a roll having a roll neck rotatably supported in the bearing and slidable axially therein, a thrust bearing mounted on the roll neck outwardly of the radial bearing and separated therefrom axially, opposed pairs of retaining members for the thrust bearing mounted thereon at opposite sides of the bearing axis and in position to resist, respectively, the outward and inward endwise movement of the bearing, and an adjusting device for each pair, common to both members thereof.

JOHN W. SHEPERDSON.
BERNARD L. BURNS.